Patented Apr. 17, 1928.

1,666,715

UNITED STATES PATENT OFFICE.

RICHARD METZGER, OF HEIDELBERG, GERMANY, ASSIGNOR, BY MESNE ASSIGNMENTS, TO GRASSELLI DYESTUFF CORPORATION, OF NEW YORK, N. Y., A CORPORATION OF DELAWARE.

DYEING PREPARATION FOR CELLULOSE ESTERS.

No Drawing. Application filed March 4, 1926, Serial No. 92,346, and in Germany May 7, 1925.

I have found that mixtures of difficultly soluble or insoluble organic compounds capable of use for dyeing cellulose esters either directly or by way of coupling, with molasses (residual liquors from sugar refining) are excellently suitable for dyeing and printing cellulose esters. Said compounds may be dyestuffs or other coloured compounds or dyestuff components.

Cellulose esters, for example cellulose acetate silk can be dyed with the said new preparations with the usual additions or also without any auxiliaries and the rayon remains soft and supple. Dyeing of the esters may be effected from a neutral bath, or in contradistinction to preparations containing soap, or salts or sulfonated fatty acids, from acid dye-baths; accordingly, it is possible to produce multi-colour effects in a single bath not only on mixed fabrics of cotton and cellulose esters, but also of cellulose esters and animal fibres, for example wool. Of course, the new preparations can also be employed in weakly alkaline liquors, for example in conjunction with soap. For printing cellulose esters the new preparations are applied with the usual thickening agents and steamed.

The molasses may be replaced in part by concentrated sulfite cellulose waste liquor. The preparations may also contain further components as for example protective colloids or other substances useful in dyeing and the like. They are best made in a concentrated form, perferably as a paste, and in such form have the advantage of allowing no dyestuff to separate and not being damaged by severe cold, and accordingly they can be shipped also during the winter; they can also easily be transformed into solid products for example by evaporation in vacuo. As examples of substances suitable for use in producing dyeings on cellulose esters, weakly basic aromatic amino compounds, such as nitro-aryl-amines or amino-anthroquinones, may be cited, but any other organic compounds which are capable of directly producing dyeings in full and deep shades useful for practical purposes on cellulose esters, but are not sufficiently soluble in water to permit the use of their aqueous solutions for producing such dyeings, may be employed as well.

My invention will be further illustrated by the following examples to which, however, the invention is not limited. The parts are by weight.

*Example 1.*

23.4 parts of a press-cake containing 85.4 per cent of amino-azo-benzene are well mixed with 72.4 parts of molasses and ground for some time with 4.2 parts of water. The preparation so obtained when diluted with water gives a bath suitable for dyeing acetyl cellulose without any further treatment.

*Example 2.*

78 parts of beet sugar molasses, 2 parts of saponin and 20 parts of di-nitro-diphenyl-amine are mixed with each other in the manner described in Example 1.

*Example 3.*

330 parts of a press-cake containing 60 per cent of 1.4.5.8-tetra-amino-anthraquinone, 550 parts of molasses, 100 parts of concentrated purified sulfite cellulose waste liquor and 20 parts of sodium dicresyl-phosphate are intimately mixed. A homogenous paste is obtained from which the dyestuff does not separate even when very much diluted with water.

Instead of the said tetra-amino-anthraquinone other compounds, for example other amino-anthraquinones or amino-hydroxy-anthraquinones or substitution products thereof may be used as well.

I claim:

1. As a new composition of matter, a mixture comprising an organic substance which is capable of directly producing dyeings in full and deep shades on cellulose esters, but not sufficiently soluble in water to permit the use of its aqueous solution for producing such dyeings, and molasses.

2. As a new composition of matter, a mixture comprising an organic substance which is capable of directly producing dyeings in full and deep shades on cellulose esters, but not sufficiently soluble in water to permit the use of its aqueous solution for producing such dyeings, molasses and sulfite cellulose waste liquor.

3. As a new composition of matter a mixture comprising a weekly basic aromatic amino compound which is capable of directly producing dyeings in full and deep shades on cellulose esters, but not sufficiently soluble in water to permit the use of its aqueous solution for producing such dyeings, and molasses.

4. As a new composition of matter a mixture comprising a weakly basic aromatic amino compound which is capable of directly producing dyeings in full and deep shades on cellulose esters, but not sufficiently soluble in water to permit the use of its aqueous solution for producing such dyeings, molasses and sulfite cellulose waste liquor.

In testimony whereof I have hereunto set my hand.

RICHARD METZGER.